(No Model.)
W. R. COLLIER.
PULLEY HUB.
No. 438,283. Patented Oct. 14, 1890.
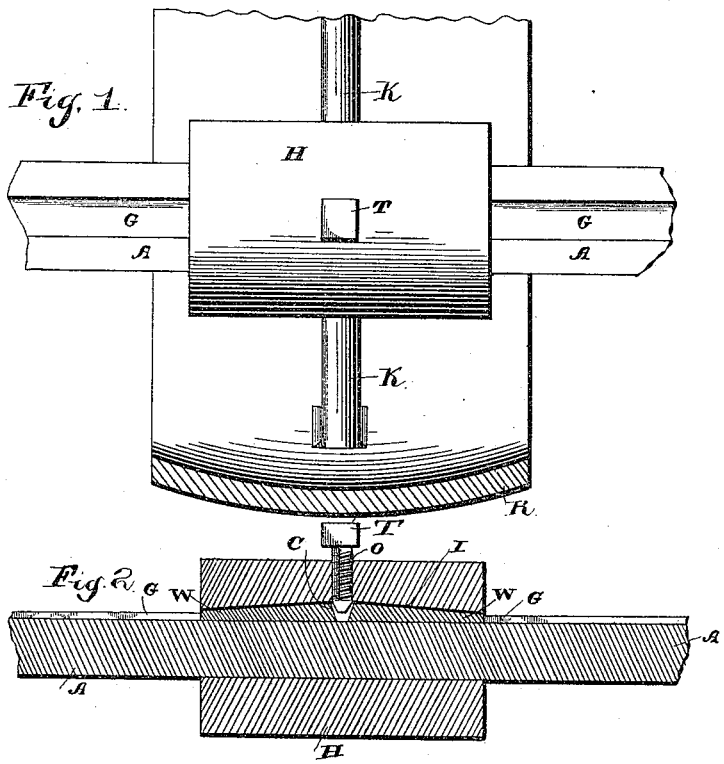
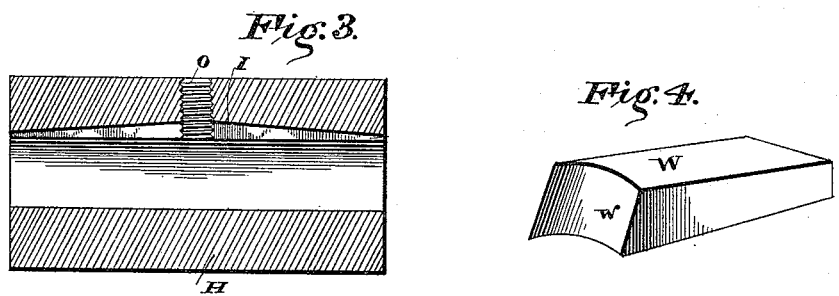
Witnesses
Inventor
Wm. R. Collier
By his Attorneys,
C. A. Snow & Co.

UNITED STATES PATENT OFFICE.

WILLIAM REID COLLIER, OF COLMESNEIL, TEXAS.

PULLEY-HUB.

SPECIFICATION forming part of Letters Patent No. 438,283, dated October 14, 1890.

Application filed June 24, 1890. Serial No. 356,590. (No model.)

*To all whom it may concern:*

Be it known that I, WILLIAM REID COLLIER, a citizen of the United States, residing at Colmesneil, in the county of Tyler and State of Texas, have invented a new and useful Pulley-Hub, of which the following is a specification.

This invention relates to pulleys, and more particularly to the means employed for attaching the hubs thereof firmly but removably to the shaft upon which the pulleys are mounted; and the object of the invention is to effect improvements upon the well-known "spline-and-groove" connection.

To this end the invention consists of a hub having upon its interior two outwardly-tapering grooves, wedges moving within said grooves, and a screw having a pointed tip passing between the inner ends of the wedges to separate them, all as hereinafter more fully described, and illustrated in the drawings, in which—

Figure 1 is a plan view of a pulley-hub provided with my improved locking means. Fig. 2 is a central longitudinal section of the hub of the pulley, showing the wedges and screw therein and the manner in which the former are seated in the groove in the shaft. Fig. 3 is a similar section of the hub with all other parts removed. Fig. 4 is a perspective detail of one of the wedges.

Referring to the said drawings, R is the rim of a pulley which is connected by spokes K with its hub H, and A is an ordinary shaft having a groove G, all as is common in the art.

Coming now to the present invention, the hub H is provided on its interior with a groove corresponding in breadth with that in the shaft, but deeper at its center than at its ends—that is to say, the bottom of this groove inclining, as at I, toward a point midway between the ends of the hub—and at this point is a threaded opening O, as seen in Fig. 3. Two wedges W are provided whose lower faces are flat, whose upper faces are inclined on the same angle with the faces I of the groove in the hub, and whose inner ends are also slightly inclined, as shown at $w$. T is a thumb-screw or any other screw, which fits in the opening O, and whose tip is made conical, as at C.

In assembling the parts of this improved pulley the wedges W are first placed in the inclined groove I of the hub H, and the latter passed over the shaft, so that the wedges shall stand in the groove G thereon. The screw T is then inserted in the opening O and turned, and as its tip C moves downwardly between the inclined inner ends $w$ of the wedges the latter are forced outwardly toward the smaller ends of the inclined grooves I, thereby tightening the wedges within the hub and within the groove on this shaft, and thus effecting a very strong and durable connection between the hub and shaft.

What I claim is—

1. The herein-described pulley, whose hub H is provided with a groove I in its bore inclined in the direction of its length, and a threaded opening O through said hub at the larger end of said groove, a wedge W, seated in said groove, and a screw T, having a conical tip C, seated in said opening and standing against the larger end of said wedge, the whole adapted for use substantially as set forth.

2. The combination, with the shaft A, having a groove G, of a pulley having a hub H, provided with an internal groove I, corresponding in width with the groove in the shaft and increasing in depth from both ends of the hub to the center thereof, a threaded opening O through the hub at the center of its groove, two wedges W, seated in said grooves G and I, and having inclined larger ends $w$, and a set-screw T, seated in said opening with its conical point C between said inclined ends, the whole adapted for use substantially as hereinbefore set forth.

In testimony that I claim the foregoing as my own I have hereto affixed my signature in presence of two witnesses.

WILLIAM REID COLLIER.

Witnesses:
 B. E. MOORE,
 J. W. GILMORE.